(12) United States Patent
McKay et al.

(10) Patent No.: US 10,360,464 B1
(45) Date of Patent: Jul. 23, 2019

(54) SYSTEMS AND METHODS FOR BIOMETRIC AUTHENTICATION WITH LIVENESS DETECTION

(71) Applicant: JPMorgan Chase Bank, N.A., New York, NY (US)

(72) Inventors: Duich McKay, Glasgow (GB); Gil McErlane, Erskine (GB); Alex Lieberman, Marlboro, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 57 days.

(21) Appl. No.: 15/448,990

(22) Filed: Mar. 3, 2017

Related U.S. Application Data

(60) Provisional application No. 62/343,253, filed on May 31, 2016, provisional application No. 62/317,765, filed on Apr. 4, 2016, provisional application No. 62/303,773, filed on Mar. 4, 2016.

(51) Int. Cl.
*G06K 9/00* (2006.01)
*G06F 21/32* (2013.01)

(52) U.S. Cl.
CPC ......... *G06K 9/00906* (2013.01); *G06F 21/32* (2013.01); *G06K 9/00912* (2013.01)

(58) Field of Classification Search
None
See application file for complete search history.

(56) References Cited

U.S. PATENT DOCUMENTS

| | | | |
|---|---|---|---|
| 7,117,365 B1 | 10/2006 | Rump et al. | |
| 8,028,896 B2 | 10/2011 | Carter et al. | |
| 8,457,367 B1 * | 6/2013 | Sipe | G06K 9/00221 |
| | | | 382/118 |
| 8,751,393 B1 | 6/2014 | Murray et al. | |
| 8,972,741 B2 | 3/2015 | Awatsu et al. | |
| 8,984,276 B2 | 3/2015 | Benson et al. | |
| 9,229,235 B2 | 1/2016 | Ballard | |
| 2005/0063569 A1 | 3/2005 | Colbert et al. | |
| 2006/0000896 A1 | 1/2006 | Bonalle et al. | |
| 2006/0016872 A1 | 1/2006 | Bonalle et al. | |
| 2006/0206723 A1 | 9/2006 | Gil et al. | |

(Continued)

FOREIGN PATENT DOCUMENTS

WO WO-2017123702 A1 * 7/2017 ............... G06K 9/36

*Primary Examiner* — Justin P. Misleh
(74) *Attorney, Agent, or Firm* — Hunton Andrews Kurth LLP

(57) ABSTRACT

Systems and methods for biometric authentication with liveness detection are disclosed. A method of biometric authentication may be performed in an information processing apparatus including at least a memory, a communication interface, at least one computer processor, a display, and an image capture device. The method may include (1) receiving a streaming images of a user's face captured by the image capture device; (2) graphically presenting, on the display, the streaming images, a target and a moveable object; (3) detecting a movement of a feature of the user's face in the streaming images; (4) graphically presenting the movement of the feature of the user's face on the display by moving the object in a direction of the movement of the feature of the user's face; and (5) determining whether the user is live based on the movement.

8 Claims, 10 Drawing Sheets

(56) References Cited

U.S. PATENT DOCUMENTS

| | | |
|---|---|---|
| 2006/0279726 A1* | 12/2006 | Galambos .......... G06K 9/00221 |
| | | 356/71 |
| 2008/0235788 A1 | 9/2008 | El Saddik |
| 2010/0060417 A1 | 3/2010 | Niinuma |
| 2010/0180336 A1 | 7/2010 | Jones |
| 2010/0228692 A1 | 9/2010 | Guralink et al. |
| 2010/0299530 A1* | 11/2010 | Bell ...................... G06F 21/32 |
| | | 713/186 |
| 2012/0086827 A1* | 4/2012 | Hanina ................. A61B 5/004 |
| | | 348/222.1 |
| 2013/0269013 A1 | 10/2013 | Parry |
| 2014/0189856 A1 | 7/2014 | Yoo |
| 2014/0333413 A1 | 11/2014 | Kursun et al. |
| 2014/0333414 A1 | 11/2014 | Kursun |
| 2014/0333415 A1 | 11/2014 | Kursun |
| 2016/0196475 A1* | 7/2016 | Martin ............... G06K 9/00906 |
| | | 382/117 |
| 2016/0335483 A1* | 11/2016 | Pfursich ............ G06K 9/00899 |
| 2017/0185760 A1* | 6/2017 | Wilder .................... G06F 21/36 |
| 2017/0337439 A1* | 11/2017 | Ackerman .......... G06K 9/4661 |
| 2018/0173979 A1* | 6/2018 | Fan .......................... G06K 9/00 |
| 2019/0102608 A1* | 4/2019 | Wang ................ G06K 9/00281 |

\* cited by examiner

SYSTEMS AND METHODS FOR BIOMETRIC AUTHENTICATION WITH LIVENESS DETECTION

RELATED APPLICATIONS

This application claims priority to U.S. Provisional Patent Application Ser. No. 62/303,773 filed Mar. 4, 2016; U.S. Provisional Patent Application Ser. No. 62/317,765 filed Apr. 4, 2016; and U.S. Provisional Patent Application Ser. No. 62/343,253 filed May 31, 2016. The disclosures of each of these applications is hereby incorporated, by reference, in its entirety.

BACKGROUND OF THE INVENTION

Field of the Invention

The present disclosure relates generally to systems and methods for biometric authentication with liveness detection.

DESCRIPTION OF THE RELATED ART

Biometric authentication may be used to verify the identity of an individual that may be conducting a transaction, accessing an area, or accessing a resource. When image-based biometrics, such as facial feature detection, is used, there is a risk of spoofing as an image or model of an individual may be presented to the camera in an attempt to trick the authentication system that the individual to be authenticated in physically present.

SUMMARY OF THE INVENTION

Systems and methods for biometric authentication with liveness detection are disclosed. In one embodiment, a method of biometric authentication may be performed in an information processing apparatus including at least a memory, a communication interface, at least one computer processor, a display, and an image capture device. The method may include (1) receiving a streaming images of a user's face captured by the image capture device; (2) graphically presenting, on the display, the streaming images, a target and a moveable object; (3) detecting a movement of a feature of the user's face in the streaming images; (4) graphically presenting the movement of the feature of the user's face on the display by moving the object in a direction of the movement of the feature of the user's face; and (5) determining whether the user is live based on the movement.

In one embodiment, the method may further include extracting a biometric feature from at least one image in the streaming images; retrieving a stored biometric feature for the user; and authenticating the user by comparing the extracted biometric feature to the stored biometric feature.

In one embodiment, the method may further include receiving identifying information for the user, wherein the identifying information is used to retrieve the stored biometric feature for the user.

In one embodiment, the method may further include extracting a biometric feature from at least one image in the streaming images; identifying a matching biometric feature that matches the extracted biometric feature in a database comprising a plurality of stored biometric features; retrieving an identity associated with the matching biometric feature; and authenticating the user.

In one embodiment, the information processing apparatus may be a mobile electronic device, a point of transaction device, an access device for a protected area, an access device for a resource, etc.

According to another embodiment, a method of biometric authentication is disclosed. In one embodiment, in an information processing apparatus including at least a memory, a communication interface, at least one computer processor, a display, and an image capture device, the method may include: (1) capturing a first image of a user's face in a first lighting condition; (2) identifying a facial feature in the first image of the user's face and a first lighting effect associated with the facial feature; (3) capturing a second image of a user's face in a second lighting condition; (4) identifying a second lighting effect associated with the facial feature in the second image of the user's face; (5) identifying a difference between the second lighting effect and the first lighting effect; (6) determining that the difference between the second lighting effect and the first lighting effect is caused by a change from the first lighting condition to the second lighting condition; (7) determining, based on the difference that a live face has been presented.

In one embodiment, the method may further include upon determining a live face has been presented, extracting one or more biometric features from at least one of the first and second images; and authenticating the user based on the extracted biometric features.

In one embodiment, the method may further include upon determining a live face has not been presented, terminating the authentication process.

In one embodiment, the information processing apparatus may be a mobile electronic device, a point of transaction device, an access device for a protected area, an access device for a resource, etc.

In one embodiment, the difference between the second lighting effect and the first lighting effect is a shading difference, a tonal difference in color, etc.

In one embodiment, the facial feature may be an eye, a facial edge, a lip, etc.

In one embodiment, the second lighting condition may include a flash, and the method may further include determining if red eye is present in at least the second image.

In one embodiment, the first image and the second images are part of a video.

According to another embodiment, in an information processing apparatus including at least a memory, a communication interface, at least one computer processor, and a display, a method of determining a graphical interactive password may include: (1) sequentially providing a plurality of graphical interactive interfaces for a user on the display; (2) receiving inputs to the each of the graphical interactive interfaces, the inputs comprising a plurality of movements to move a graphical element displayed on the display and timings of the plurality of movements; (3) identifying a behavioral pattern for the user based on the inputs; (4) determining a uniqueness of the identified behavioral pattern by comparing the identified behavioral pattern to a plurality of stored behavioral patterns for other users; and (5) saving the identified behavioral pattern as a password for the user.

In one embodiment, the plurality of graphical interactive interfaces may include a plurality of mazes, and the graphical element may be a point.

In one embodiment, the behavioral pattern may be a decision pattern based on a plurality of options, a movement speed behavior, an error behavior, etc.

In one embodiment, the method may further include providing an additional graphical interactive interface for the user on the display, receiving additional inputs to the additional graphical interactive interface, identifying the behavioral pattern for the user based on the inputs and the additional inputs, and comparing the identified behavioral pattern to a plurality of stored behavioral patterns for other users until the identified behavioral pattern is determined to be unique.

According to another embodiment, in an information processing apparatus including at least a memory, a communication interface, at least one computer processor, and a display, a method of determining a graphical interactive password may include: (1) providing a graphical interactive interface for a user on the display for a plurality of iterations; (2) receiving inputs to the each of the iterations, the inputs comprising a plurality of movements to move a graphical element displayed on the display and timings of the movements; (3) identifying a behavioral pattern for the user based on the inputs and timings; (4) determining a uniqueness of the identified behavioral pattern by comparing the identified behavioral pattern to a plurality of stored behavioral patterns for other users; and (5) saving the identified behavioral pattern as a password for the user.

In one embodiment, the graphical interactive interface may include a video game, and the graphical element may be a game character.

In one embodiment, the behavioral pattern may include a decision pattern based on a plurality of options, a movement speed behavior, a jumping behavior, a timing behavior, etc.

In one embodiment, the method may further include providing an additional graphical interactive interface for the user on the display, receiving additional inputs to the additional graphical interactive interface, identifying the behavioral pattern for the user based on the inputs and the additional inputs, and comparing the identified behavioral pattern to a plurality of stored behavioral patterns for other users until the identified behavioral pattern is determined to be unique.

According to another embodiment, in an information processing apparatus including at least a memory, a communication interface, at least one computer processor, and a display, a method of authenticating a user with a graphical interactive password may include: (1) receiving identifying information from a user; (2) providing a graphical interactive interface for the user on the display; (3) receiving inputs to the graphical interactive interface, the inputs comprising a plurality of movements to move a graphical element displayed on the display and timings of the movements; (4) identifying a behavioral pattern for the user based on the inputs and timings; (5) retrieving a stored behavioral pattern for the user based on the identifying information; (6) comparing the identified behavioral pattern to the stored behavioral patterns for other users; and (7) determining whether to authenticate the user based on the comparison.

In one embodiment, the graphical interactive interface may be a maze, a video game, etc.

In one embodiment, the behavioral pattern may be a decision pattern based on a plurality of options, a movement speed behavior, an error behavior, etc.

In one embodiment, the method may further include following a successful authentication, updating the stored behavior pattern with the identified behavioral pattern.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-8.

Embodiments of the invention relate to a biometric authentication process. This authentication may be used, for example, if a user seeks to conduct a transaction, access a network, access a resource, to sign-in to an account, access a computer or electronic device, login to an account, authorize a certain transaction (e.g., a high risk/value transaction), authorize access to a computer application, such as a mobile application, a computer program, etc. In general, the authentication may be used whenever the identity of an individual needs to be verified.

Embodiments may use facial recognition of a user's face, or a facial feature (e.g., iris) in conjunction with a "liveness test." Together, this ensures that (1) the face that is captured is the user's face, and (2) the face that is captured is that of a live person and not an image, video, or model.

Ensuring that a live human (as opposed to an image, model, or video) is being presented to the biometric authentication system is important to prevent fraud and spoofing of the system, which may then allow an unauthorized user access to computer resources or a secure/restricted area, or allow an authorized transaction. For example, illegitimate users may attempt to spoof the biometric authentication system using an image or a short video of an authorized user's face.

Figure 1:
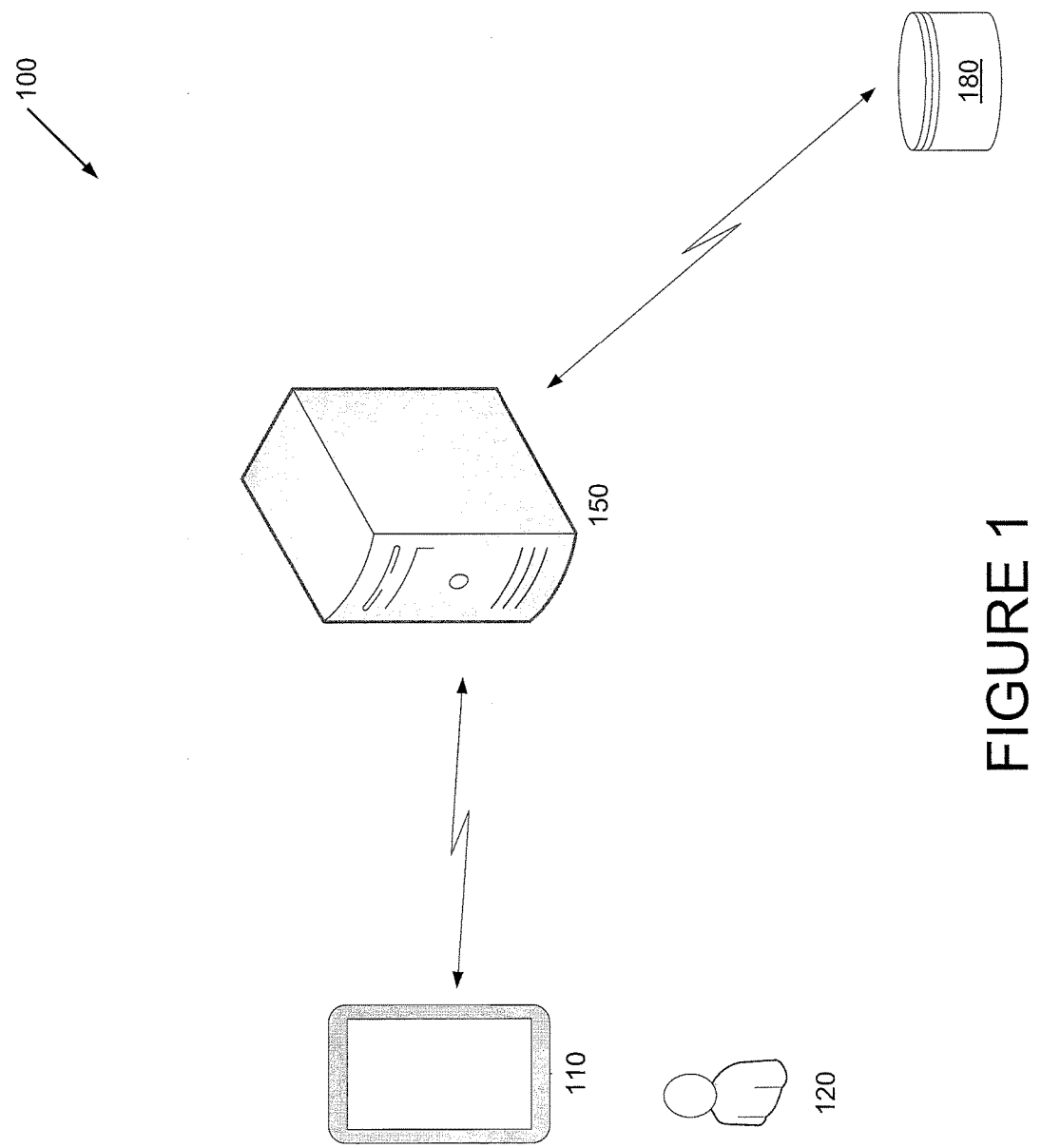
FIG. 1 depicts a system for biometric authentication according to one embodiment.

Referring to FIG. 1, a block diagram of a system for biometric authentication according to one embodiment is disclosed. System 100 may include electronic device 110 that may include at least one camera or image capture device for capturing an image of user 120.

In one embodiment, electronic device 110 may be a mobile electronic device, such as a smartphone (e.g., Apple iPhone, Samsung Galaxy, etc.), a tablet computer (e.g., Apple iPad, Samsung Galaxy, Amazon Kindle, Barnes & Noble Nook Tablet, etc.), Google Glass, an Internet of Things ("IoT") appliance, a Smart E-watch/Bracelet, etc. In another embodiment, electronic device 110 may be a desktop computer, a workstation, etc. In another embodiment, electronic device 110 may be included in a kiosk, a point of sale terminal, a security access point for a secure or restricted area, for authentication to a vehicle (e.g., as a replacement for a key, for a self-driving vehicle, etc.)

In one embodiment, electronic device 110 may be provided in a network of electronic devices (not shown). For example, electronic devices 110 may be deployed to access portals or access points for a building, floors, areas, etc.

In one embodiment, electronic device 110 may host or execute an application (not shown) that may authenticate user 120 based at least in part on an image by, for example, using facial biometrics. In another embodiment, the application may authenticate user 120 in conjunction with software executed on server 150. In another embodiment, electronic device 110 may capture the image and the authentication may be performed by software executed by server 150.

In one embodiment, the application may be executed in response to scanning a machine-readable code, such as a QR code. In one embodiment, if used as part of a logon process, a desktop computer may present a code to be scanned by electronic device 110, which may then execute the authentication application.

An example of such a process is disclosed in U.S. patent application Ser. No. 13/908,618, the disclosure of which is hereby incorporated, by reference, in its entirety.

In another embodiment, the application may be an application that may require user authentication, such as a banking application, a payment application, etc.

In still another embodiment, the application may be an application that controls access to a secure or restricted area, such as a building, a floor within the building, an area within the building, etc.

Database 180 may receive, store and/or maintain user information, account information, biometric information, etc.

Figure 2:
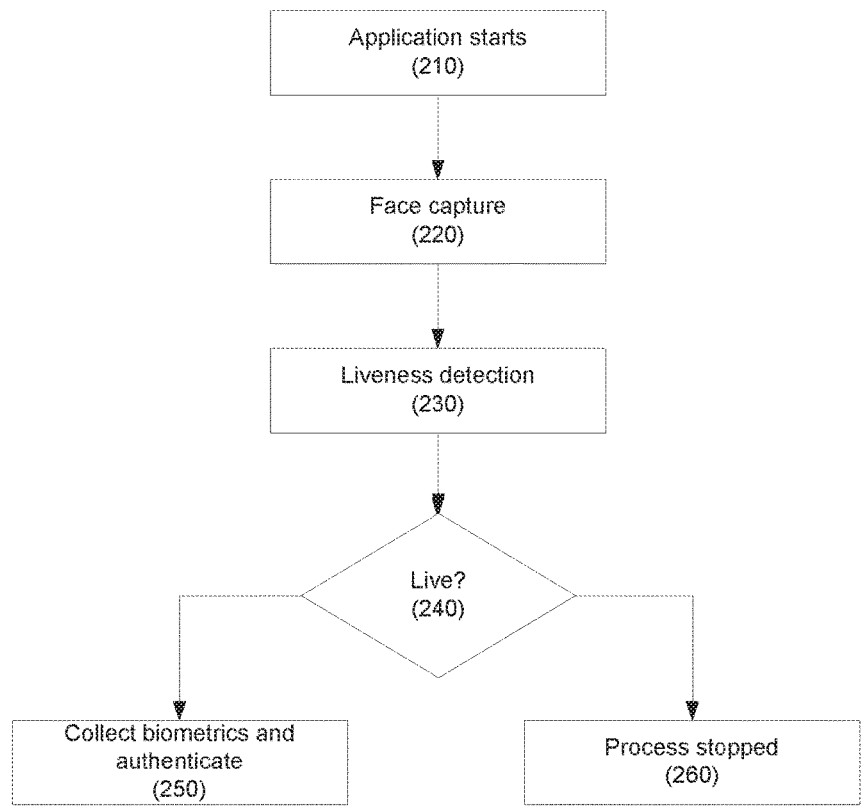
FIG. 2 depicts a method for biometric authentication with liveness detection according to one embodiment.

Referring to FIG. 2, a method of biometric authentication with liveness detection is disclosed according to one embodiment. In one embodiment, at any point of this process, the user may provide identifying information, such as a username or other identifying information. In another embodiment, the biometric data that is collected may be used to identify the user.

In step 210, a software application executed on an electronic device may be executed. In one embodiment, this may be part of an application, such as a banking application, a payment application, etc. In another embodiment, it may be part of a login process. In still another embodiment, it may be part of a security process.

In step 220, an image of a user's face, a portion thereof (e.g., an iris), or other desired body part, may be captured. In one embodiment, the image may consist of a plurality of images (e.g., streaming images), a video, etc.

In one embodiment, at any step of the authentication process, biometric data may be captured. For example, in one embodiment, the biometric data may be refined as additional angles of the user's face, or portion thereof, are captured, movement is captured, etc.

In one embodiment, the facial recognition may be any conventional facial recognition process in which a mathematical representation of the user's face is compared to a stored representation of that user's face that may be stored on the electronic device (e.g., in a secure element), on a server, etc.

In one embodiment, additional data, such as GPS data, device identification data (e.g., a device fingerprint data such as serial number, operating system information, etc.), etc. may be captured as is necessary and/or desired.

In one embodiment, a target may be provided to guide the user in moving the electronic device camera to center the user's head on the screen.

In step 230, "liveness detection" may be performed. In one embodiment, the user may establish liveness by, for example, manipulating an object (e.g., a dot or other object), to at least one target (e.g., a hollow circle). It should be noted that the object and the target are exemplary only; any other suitable representation, graphic, symbol, etc. may be used as necessary and/or desired.

Figure 3A:
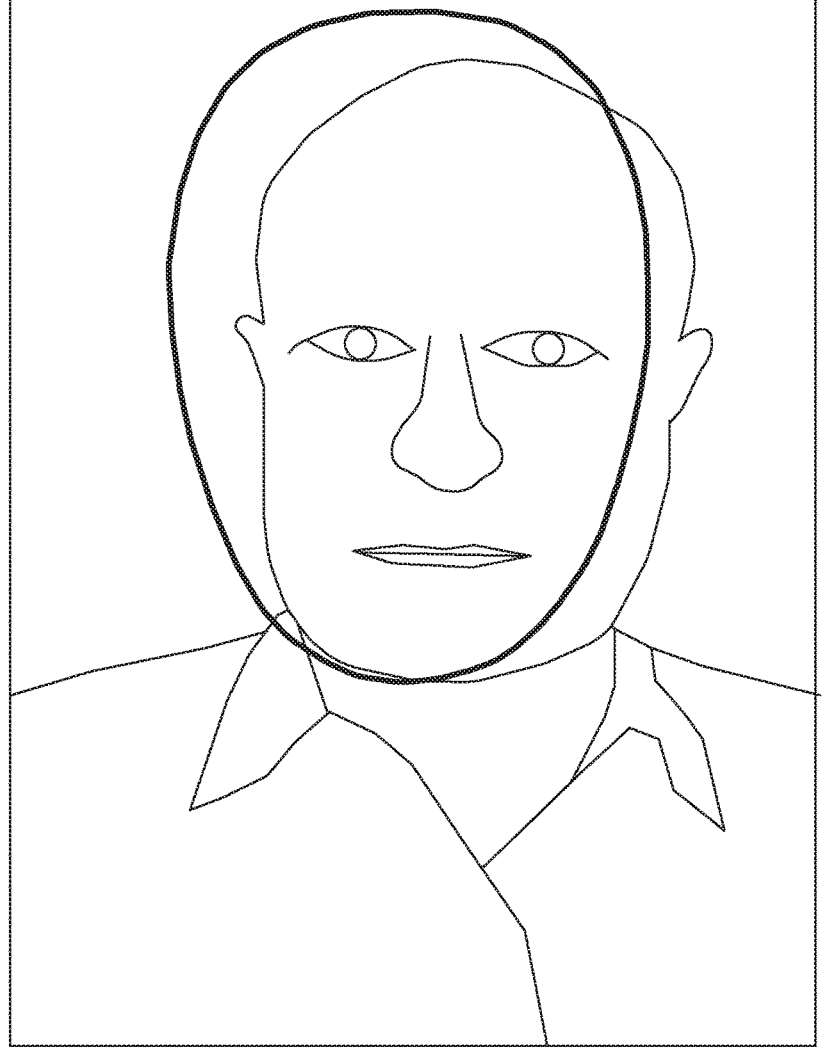
FIGS. 3A-3C depict exemplary screenshots of a biometric authentication process according to one embodiment.

An exemplary screenshot is provided in FIG. 3A.

In one embodiment, the object and/or target may not be needed, as the user may be instructed to move the object to the right, left, up, or down, or may be instructed to look to the right, left, up, or down.

In one embodiment, the user may move the object by using his or her head, thereby resulting in the movement of the user's facial features, the object may move in the same direction as the user's facial movement. In another embodiment, to "move" the object by moving the electronic device relative to the user's body. Location and orientation-detecting devices within the electronic device (e.g., GPS, gyroscopes, accelerometers, etc.) may determine the orientation and/or changes in the orientation of the electronic device as it is moved relative to the user. In one embodiment, the data received from the location and orientation-detecting devices may be used to predict what the electronic device should "see" next. Moving the electronic device around in 3D space and at different speeds and orientations relative to a stationary object (i.e., the user) may result in a biometric that is more difficult to spoof as movement of the device and the spoofing material (e.g., video, photo, etc.) would be necessary.

In one embodiment, the user may be instructed to move the object in one or more direction; no target may be provided. In another embodiment, the user may be instructed to move the electronic device in one or more direction.

In one embodiment, the instruction may be random to reduce the effectiveness of spoofing.

In another embodiment, the object may be moved in a direction opposite of the movement of the user's facial features.

In one embodiment, this may be performed concurrently with capturing the biometrics of the user's face.

An example of software that may detect movement in the user's face is Mobbeel's MobbID SDK. Other software, programs, etc. may be used as necessary and/or desired.

In one embodiment, the camera on the electronic device may detect the movement of the user's body or of the electronic device relative to the user, and the user may complete the required movement by focusing on moving the object. The process of moving the object may be performed once or a plurality of times, and the location of the "target" may vary. For example, in one embodiment, the target may first be presented on one side of the user's head, then the other side, and then above the user's head. In one embodiment, the location of the target and/or object may be random.

Figure 3B:
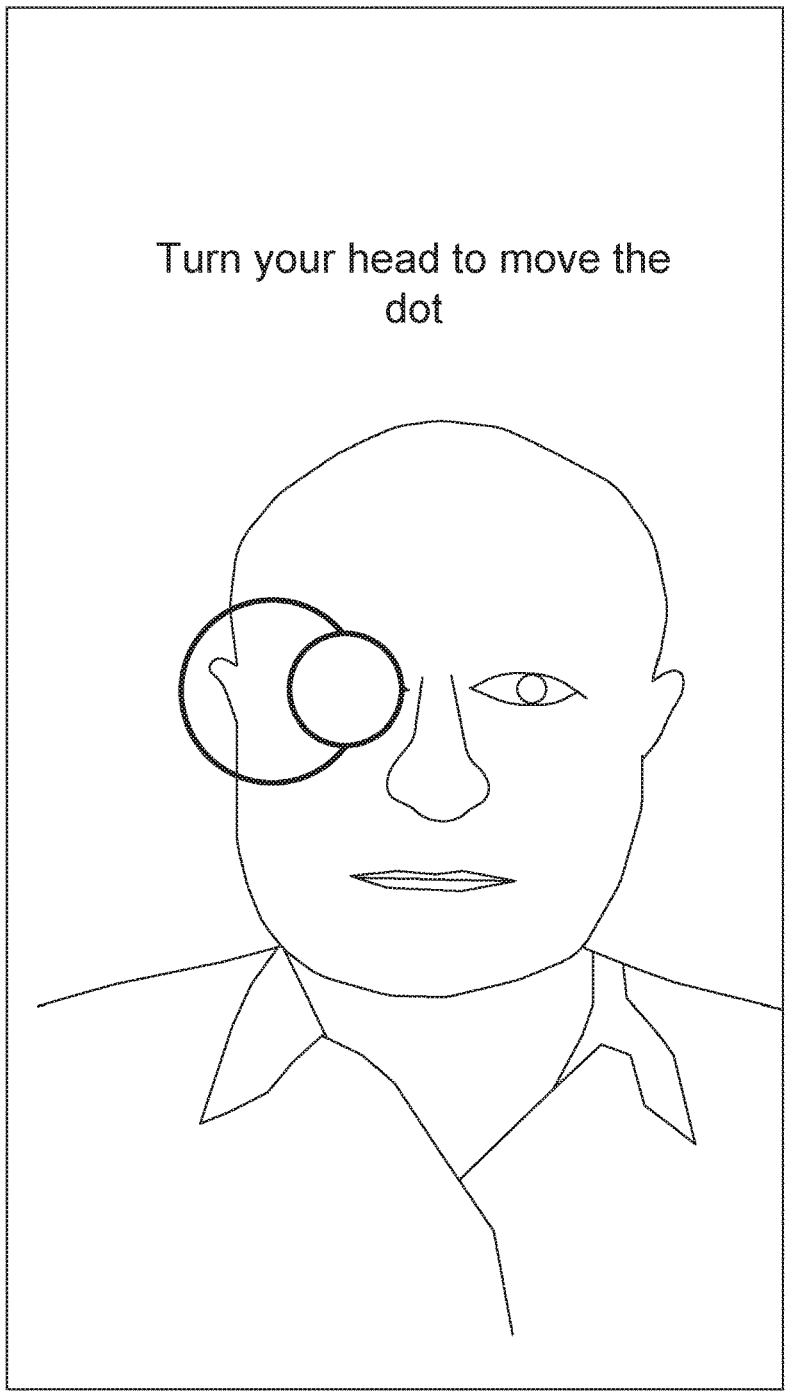
Figure 3C:
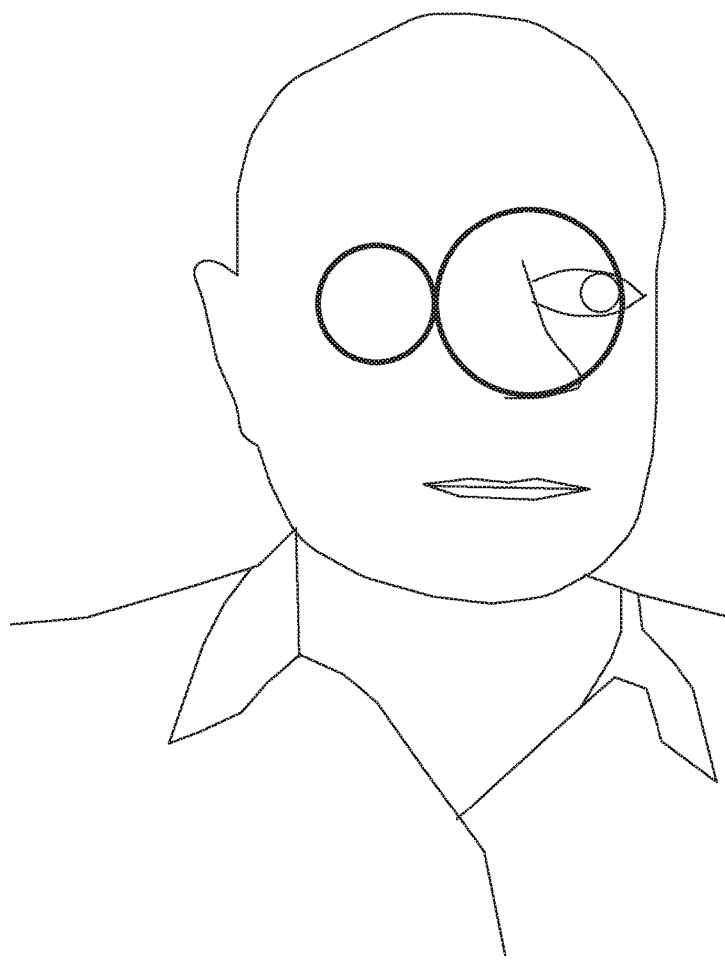

Exemplary illustrations of step 230 are provided as FIGS. 3B and 3C.

In another embodiment, the user may be instructed to move his or her head forward or backward; in other words, toward the device, or away from the device. This movement may be detected by detecting a change in the size of a feature (e.g., as the user gets closer, the facial feature is larger), or by using a focus element on the image capture device to detect the change in position.

In step 240, if the liveness detection indicates that the user is live, in step 250, the captured facial biometrics may be compared to the stored biometric data. The user may then be authenticated/authorized and the desired action (e.g., logging in, authorize a transaction, granting access, etc.) may be taken.

In one embodiment, the biometric data may be captured at any point of the liveness detection.

If the liveness detection is unsuccessful, the process may be repeated, additional authentication may be required, or the process may be terminated (e.g., step 260).

In one embodiment, the authentication may be performed by the application executed by the mobile device and/or the software executed by the server.

In another embodiment, liveness detection may be based on a comparison between a plurality of images that may be taken with different lighting levels to establish that the user is a three-dimensional object. For example, a first image may be taken using ambient lighting, and a second image may be taken using a flash, lighting from a screen, or in an area with different ambient lighting.

Figure 4:
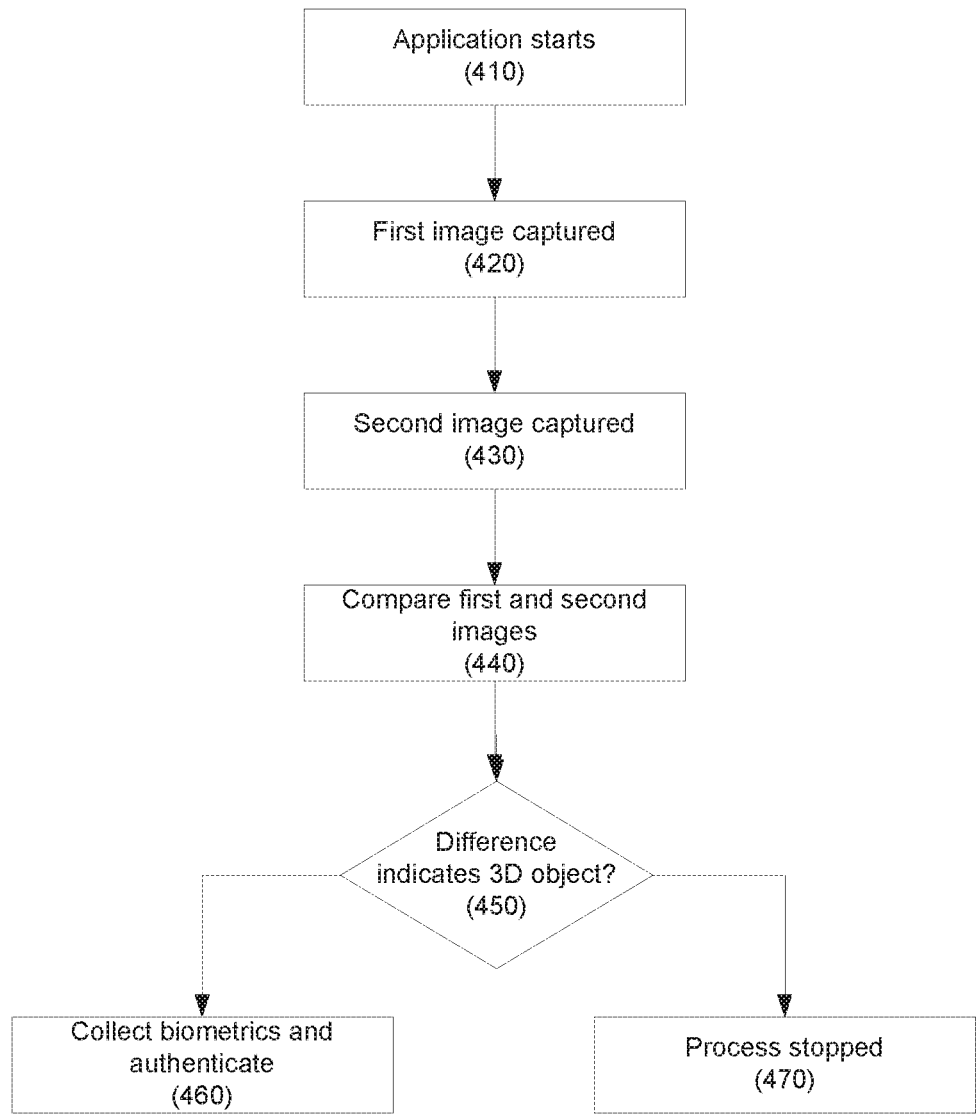
FIG. 4 depicts a method for biometric authentication with liveness detection according to another embodiment.

Referring to FIG. 4, a method of biometric authentication with liveness detection is provided according to one embodiment. In one embodiment, at any point of this process, the user may provide identifying information, such as a username or other identifying information. In another embodiment, the biometric data that is collected may be used to identify the user.

In step 410, a software application executed on an electronic device may be executed. This may be similar to step 210, above.

In step 420, a first image of a user's face or portion thereof may be captured. The first image may be captured using the digital imaging device associated with the electronic device. In various embodiments, the first image may comprise a plurality of images, a video, etc. The first image may be captured at a first lighting level. For example, the first image may be captured using ambient lighting. In another embodiment, a flash may be used.

In one embodiment, a flash may be used in conjunction with moving the electronic device relative to the user, as the electronic device may detect where it may increase lighting to test for changes. For example, if an application executed by the electronic device detects that the user has deep set eyes, the electronic device may use the macro focus with laser focus to gauge the distance between the electronic device and the user's eyes (e.g., by essentially finding where the focus goes in and out of range to determine distance). The electronic device may use this distance to test the ambient light via flash levels at that distance.

The application may then ask the user to move the camera closer to the facial feature (e.g., the eyes), and at an angle. Once positioned, the electronic device may change the lighting to cast a shadow across the user's deep set eyes after focusing differently. Thus the application may anticipate the proper curve of the shadow and depth of a 3D object because it knows the current ambient light plus how much light it will give plus the distance.

The electronic device may also request the user to move his or her face in a certain direction to check to make sure that the shadow also moves.

In step 430, a second image may be captured using a second lighting level that is different from the first lighting level. As with the first image, the second image may comprise a plurality of images, a video, etc. For example, if the first image was captured using ambient lighting, the second image may be captured using a flash, a lighting source such as the screen of the electronic device, at an area with different ambient lighting, etc.

In one embodiment, the first and/or second image may use a colored lighting source. The color and/or lighting level used in the first image and the second image may be different.

In one embodiment, any manner of providing lighting for the first and/or second images may be used so long at the lighting level is different. For example, different flash intensities, different flash colors, different ambient lighting levels, etc. may be used as is necessary and/or desired.

In one embodiment, the second image may be captured from a different angle than the first image, which may result in the first image and the second image having a different lighting level.

In one embodiment, if a video is taken, different lighting levels may be used during the video capture. For example, a first frame or frames may be captured at a first lighting level and then a second frame or frames may be captured at a second lighting level. The lighting levels may varying in intensity, that is the flash may start dim (or off) and then increase in intensity over the video sequence. This may result in multiple different images with different lighting levels for comparison.

In step 440, the first image and the second image may be compared. In one embodiment, the lighting differential (e.g., shading, tonal differences, color changes) on the images in the facial area may be compared. For example, an actual face (i.e., a three-dimensional object) will present a different response to the light from a flash than a two-dimensional image (i.e., a picture or video). In this manner the various embodiments can determine if an actual face is presented.

In the case of a video, one or more frame at a first lighting level may be compared to one or more frame at a second lighting level.

According to various embodiments, the lighting differences at features on the face may be analyzed (e.g., the edges of the face, the nose, the eyes, etc.). The lighting differences may be determined by the shading change in response to the flash. The color values may be compared between the first image and the second image. For example, the red-green-blue ("RGB") or hexadecimal color values may be compared between the different images.

In other embodiment, the first and/or second image may force "red eye" using the flash, and then the image comparison may look for the presence of red eye in the image. The presence of red eye in an image may be a strong indicator of liveness as a two-dimensional image or video will not produce red eye in response to a flash.

It should be appreciated that red-eye may not occur in a live face for a variety of factors. Accordingly, the absence of red eye may be a factor weighted in determining whether a live face is being presented but may not be a determinative factor.

In step 450, a determination if a live face has been presented may be made. If the face is live, in step 460, if not already done, biometric features may be extracted from either or both sets of images for use in authenticating the user. The captured biometrics may be compared to stored biometric data, and the user may be authenticated/authorized and the desired action (e.g., logging in, authorize a transaction, authorize access, etc.) may be taken.

In various embodiments, the facial recognition may be any conventional facial recognition process in which a mathematical representation of the user's face may be compared to a stored representation of that user's face that may be stored on the mobile device, on a server, in the cloud, etc. In various embodiments, the authentication may be performed by the application executed by the mobile device and/or the software executed by the server.

If the face is determined not to be a live face, the process may be repeated, additional authentication may be requested, or the process may be terminated (e.g., step 470). For example, other biometrics (e.g., voice, fingerprint, etc.), a password, a PIN, a digital signature, out-of-band authentication, etc. may be used for additional authentication as is necessary and/or desired.

Figure 5:
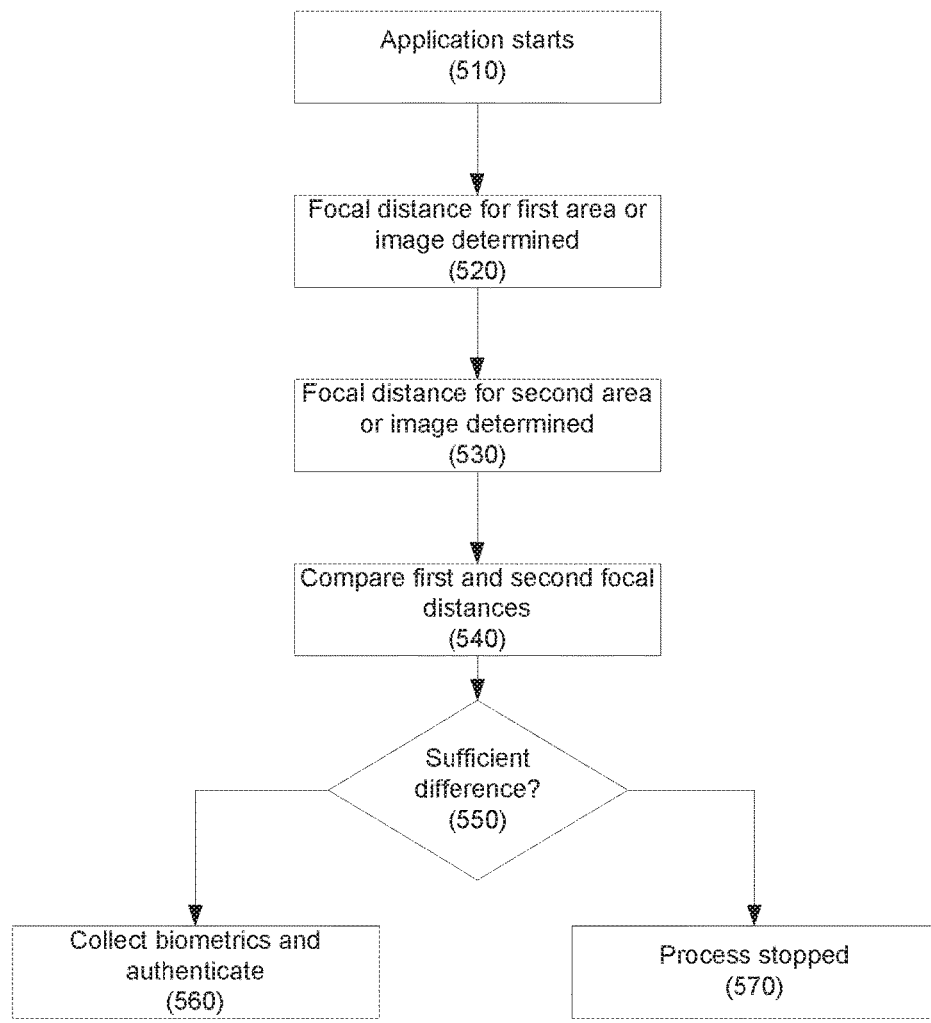
FIG. 5 depicts a method for biometric authentication with liveness detection according to another embodiment.

In another embodiment, the focal distance at various points on a user's face may be used to determine that an image is not being presented. Referring to FIG. 5, a method of biometric authentication using liveness detection is disclosed according to another embodiment. In step 510, a software application executed on an electronic device may be executed. This may be similar to step 210, above.

In step 520, an auto-focus element may focus on a first area or feature of user's face. In one embodiment, the area or feature may be a feature, such as the user's nose, that may lie in a different plane from the rest of the user's face. The autofocus element may determine a focal distance for the first area or feature.

In step 530, the autofocus element may focus on a second area or feature of the user's face. In one embodiment, the second area or feature may be in a different plane from the first feature or area. For example, if the first feature was the user's nose, the second feature may be the user's cheeks. The autofocus element may determine a focal distance for the second area or feature.

In one embodiment, the autofocus element may focus on the first area or feature and the second area or feature simultaneously, or substantially simultaneously, in order to minimize the effect of a distance change between the user and the electronic device. In one embodiment, data from the electronic device, such as gyroscopes, accelerometers, etc., may be used to detect a difference in positioning of the electronic device relative as the different focal distances are measured.

In step 540, the electronic device may compare the focal distance for the first area or feature to the focal distance for the second area or feature. If, in step 550, the focal distances differ by an acceptable amount, then it may be determined that the object before the electronic device is a three-dimensional object, and not an image or video. In one embodiment, a range of acceptable amounts may be used. In another embodiment, the distance for a registered user may be used as a baseline for comparision.

In step 560, the captured facial biometrics may be compared to the stored biometric data. The user may then be authenticated/authorized and the desired action (e.g., logging in, authorize a transaction, granting access, etc.) may be taken.

If the focal distance difference does not indicate a three-dimensional object, the process may be repeated, additional authentication may be required, or the process may be terminated (e.g., step 570).

In another embodiment, multiple cameras may be used. The multiple cameras may be provided in a single electronic device. In another embodiment, cameras from multiple electronic devices may be used. For example, an in-store camera system may be used to recognize a user when the user is authenticating himself or herself to an electronic device. Thus, the in-car system may provide additional biometric authentication as well as checking other factors, such as physical presence in the store, wearing the same clothes, wearing same hair style, etc. in both images. Wireless positioning of the electronic device relative to the in-store cameras may be used to confirm the user's location.

In another embodiment, other interactive activity may be used to determine liveness. According to various embodiments, an application requiring authentication may present the user with a game or puzzle that has been designed to allow for many different combinations of movements. The user may enter a known or predetermined combination of movements into the game or puzzle. Upon identifying this combination plus the combination of the timing of the user's movements, the user can be identified with a high degree of certainty. Thus, a user can be uniquely identified through interaction with a game or puzzle.

For example, a user may interact with a puzzle or game that may involve jumping or moving to a series of platforms. The sequence of moves used by the user, coupled with the timing of those moves can be used to identify the user. According to various embodiments, the user may establish the sequence of moves, as well as the timing, as a pattern for later use in authenticating the user.

A variety of puzzles and/or games may be used as is necessary and/or desired.

In recording the pattern, which may include both the movement pattern and the timing, software may record the user's movement combination and timing. In one embodiment, the user may re-enter the pattern once or several times to capture any variance in timing ranges to be expected in real-time scenarios going forward. This may be saved and may be used as a baseline for comparison in the future when authentication is required.

In one embodiment, a nCr model may be used. In the nCr model, n represents the number of distinguishable objects, r represents the frame rate of the game, and C represents number of pixel locations represents the player's position on each platform. For example, assuming 10 platforms (n) at 100 pixels each (C), and a frame rate of 30 frames per second (r), there are 30,000 distinguishable locations. This can be taken in a number of unordered combinations related to how many times the player jumps or moves, and the player can move uniquely within each frame, so even with just 10 different sample points, there are $1.6 \times 10^{38}$ combinations. It should be appreciated that there may be more than 10 sample points, so there exists a pseudo-infinite number of combinations.

In one embodiment, if the game player (i.e., the user) is a human, then the moves and timing will be different than those of a computer. Computers typically uses a brute force method in a fixed pattern that differs from the way a human would approach it. Further, even if a computer used the same moves as the player, the timing would be different. The computer would have the exact same timing each time whereas a human's timing would vary slightly over each try. Thus, in one embodiment, the player may be asked to perform the puzzle or game multiple times. The system may compare the timing of each iteration and would expect to see a small variation for each time with the same pattern. This timing variation would assist in confirming that a live person is present.

Figure 6:
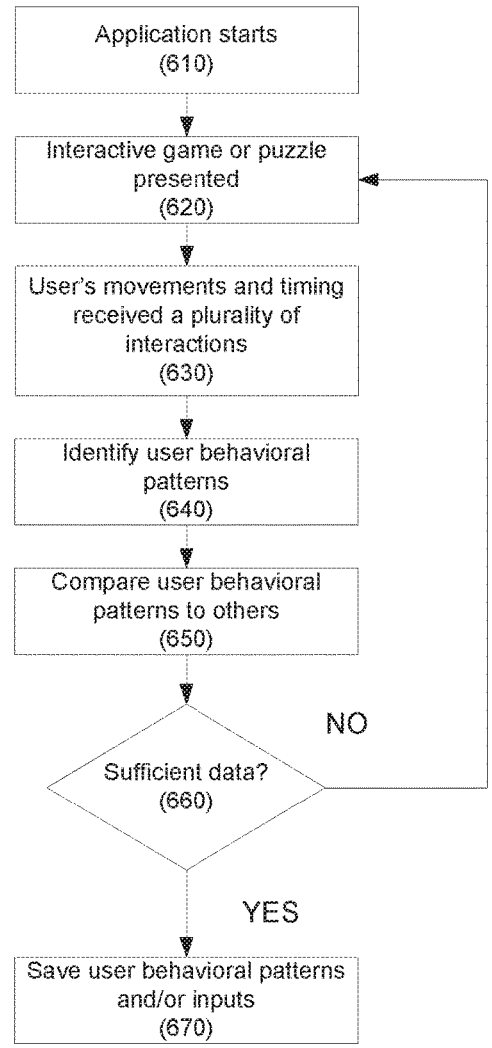
FIG. 6 depicts a method for biometric authentication with liveness detection according to another embodiment.

Referring to FIG. 6, a method of determining an interactive password is provided according to various embodiments.

In step 610, a software application may executed on an electronic device, such as a mobile device, desktop, kiosk, access point to a restricted area, etc.

In one embodiment, the user may be authenticated so that the user is known to the system.

In step 620, an interactive game or puzzle may be presented to the user. The user may be asked to interact with the game or puzzle by performing a series of user movements (e.g., moves or entries). For example, a game or puzzle may be presented to the user and the user may be required to interact with the game or puzzle by providing inputs, such as movements. For example, in a game, the user may be required to have a character jump from one position to another on a series of platforms. In other embodiments, the user may tap certain points on the display in a certain order. In other embodiments, the user may tap on targets or other moving items on the display in a particular order. In other embodiments, the user may shoot at targets in a particular order using a particular number of rounds. In another embodiment, the user may be required to navigate a maze. It should be noted that these embodiments are exemplary only and any suitable puzzle or game may be presented for user interaction as is necessary and/or desired.

In step 630, the user's movements and the timing of the movements (e.g., user inputs) a plurality of interactions may be received. The number of interactions may vary as necessary and/or desired. The user's movements and the timing of those movements may be recorded.

In step 640, one or more behavioral patterns, or rules, for the user may be determined from the interactions. For example, in one embodiment, machine-based learning may be used to learn the user's behavioral patterns over multiple interactions. For example, in one embodiment, the interaction may involve the user navigating a maze, and the user may be presented with a plurality of mazes to interact with. In one embodiment, the mazes may be randomly generated.

Based on the user's interaction with the interactive game or puzzle, the behavioral pattern or rule may be identified. For example, when presented with a first decision in a maze, the user may always go to the right. As another example, if the user is moving a character, the user's first input may be a jump rather than a directional move. As another example, the point at which the user "turns around" after a wrong turn in a maze may be evaluated (e.g., backtracking after two wrong turns). Other exemplary behavioral patterns or rules may include seeing a solution without error on complex problems, going around objects counterclockwise, etc.

In step 650, the user behavioral patterns may be compared to those of other users in order to identify unique behavioral patterns.

In step 660, if there is sufficient data to identify a unique behavioral pattern, in step 670, the behavioral pattern(s) and/or the combination of the user's movements and the timing of those movements for one or more of the interactions may be saved as a password. In one embodiment, the user's movements and timings of those movements for each interaction may be saved separately, or they may be averaged.

If, in step 660, there is insufficient data, the user may provide additional interactions.

Figure 7:
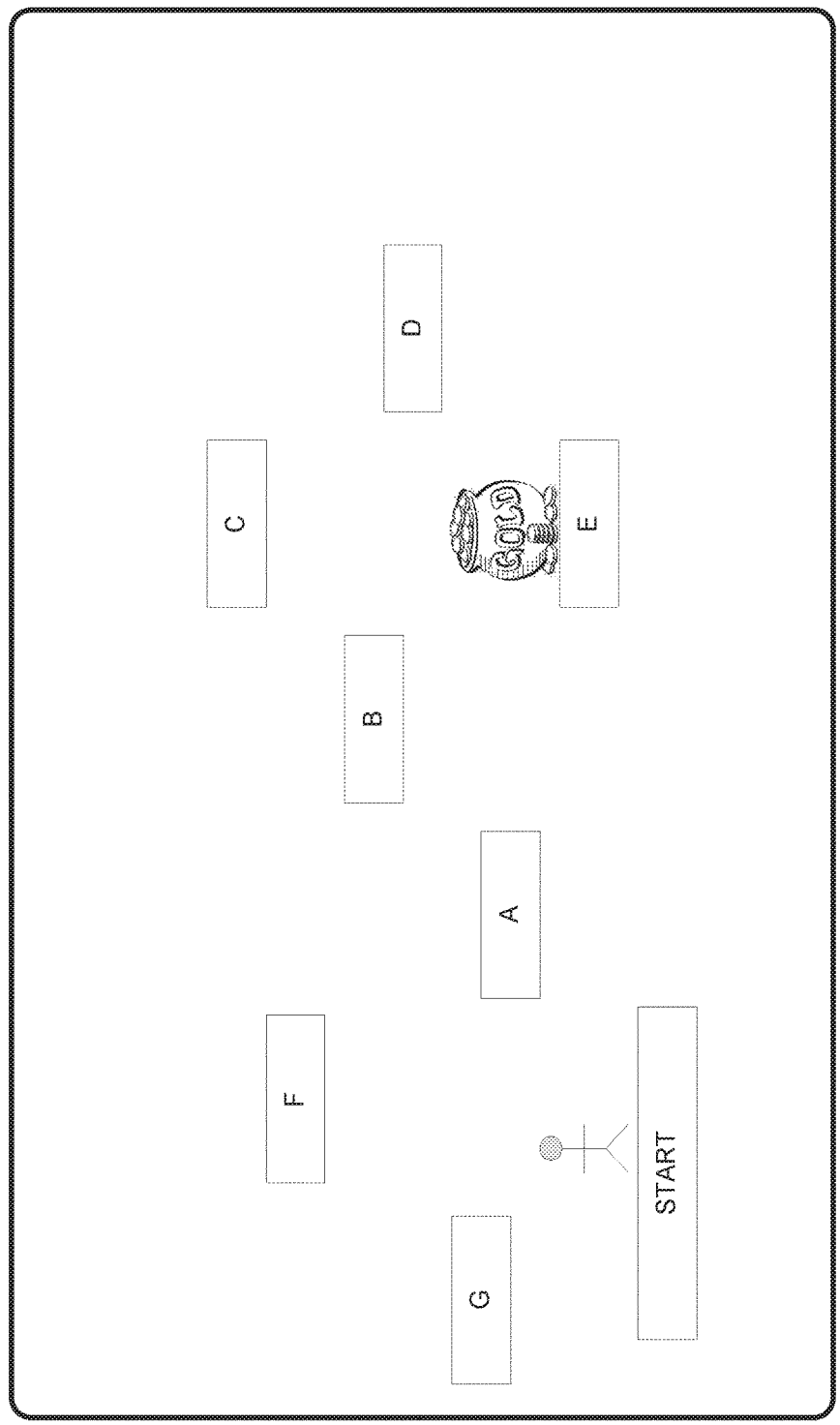
FIG. 7 depicts a method for determining an interactive password according to another embodiment.

Referring to FIG. 7, an exemplary game screen is depicted according to one embodiment. In this example, the user may cause the player character to jump or move to a series of the blocks in a particular sequence. For example, as depicted in FIG. 7, a combination of A, B, C, D, E may be used. This is but one of many possible combinations for moves alone. In addition, the timing of each move may be monitored, which increases the number of possible combinations.

In one embodiment, the user may be instructed to perform a minimum number of moves. In various embodiments, the user may be instructed that a minimum number of moves is required. The user may perform greater than that number of moves.

Figure 8:
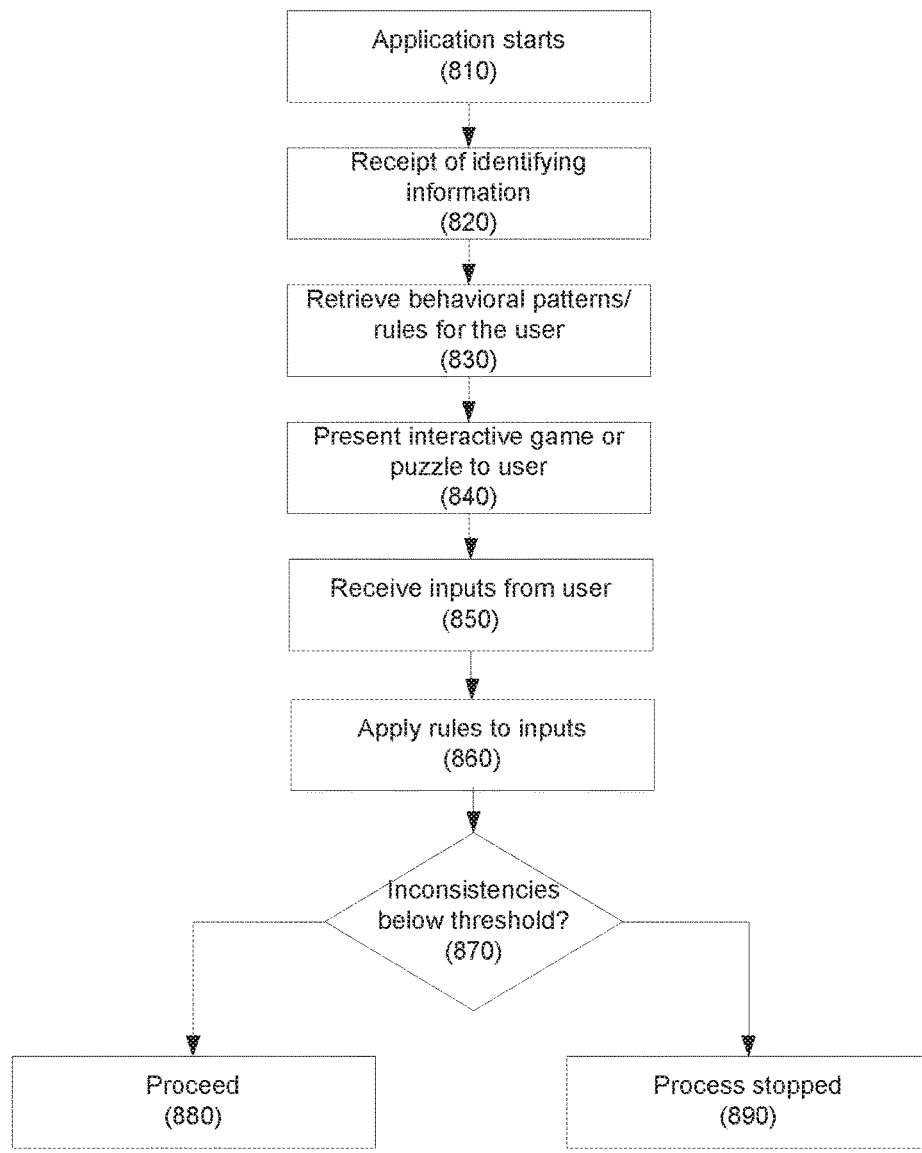
FIG. 8 depicts an exemplary interactive game or puzzle that may be used in biometric authentication according to another embodiment.

Referring to FIG. 8, a method of authentication is provided according to various embodiments. In one embodiment, the method may involve the behavioral patterns or rules discussed above.

In step 810, a software application may executed on an electronic device, such as a mobile device, desktop, kiosk, access point to a restricted area, etc. The software application may be for accessing a resource, including physical resources and computing resources. The computing resource may be separate from the software application but relies upon the software application to verify the identity of the user. In other embodiments, the software application may itself require authentication to use. A set-up or configuration routine for access may be executed by or through the software application. According to various embodiments, the execution of the software application may be the initial use of the application such that a set-up routine is executed. In certain embodiments, the set-up routine may be run to reset access to the software.

In step 820, the user may be asked to enter identifying information. For example, the user may be asked to enter a username or other identifying information. In another embodiment, the identifying information may be provided via a key, a USB drive, a card, a token, a PIN, a code, a password, etc. In certain embodiments, biometric authentication may be used such as facial recognition, fingerprint scan, or a retinal scan. In one embodiment, the identifying information may be provided at any suitable point in the process.

In step 830, based on the identification, the user's stored behavioral pattern(s) or rules may be retrieved.

In step 840, the user may be presented with an interactive game or puzzle in order to extract authenticating information. In one embodiment, the same interactive game or puzzle that was used to register the behavioral patterns or rules; in another embodiment, a different interactive game or puzzle may be presented. In one embodiment, the type of interactive game or puzzle that was used for registration may be the same. For example, if the user was registered using a maze, a maze (albeit a different maze) may be presented.

In step 850, the user's interactions with the interactive game or puzzle may be received and evaluated. In one embodiment, this may be similar to the way that the user's interactions were registered.

In step 860, either during the interaction, or after the interaction is complete, the behavioral patterns or rules may be applied. In step 870, if the inconsistencies between the stored behavioral patterns or rules and the inputs are below a certain threshold, in step 880, the user may be authenticated and may proceed. If the inconsistencies are not below a certain threshold, the process may be stopped (e.g., step 890), an alternate form of authentication may be provided, a different interactive puzzle or game may be presented, etc.

For example, in one embodiment, after the user does something inconsistent with a behavioral pattern or rule, the user may be presented with a different interactive puzzle or game. If the user does something inconsistent with a behavioral pattern or rule again, the authentication process may stop and a different process may be used.

The number of inconsistent required before the interactive puzzle or game is changed, or the process is stopped, may be determined as is necessary and/or desired. For example, it may be based on the nature of the access sought, wherein for more sensitive access, the user may be afforded fewer inconsistencies.

In one embodiment, the timing of the presentation of the new interactive puzzle or game may be such that the user may not know when the inconsistent behavior occurred.

In another embodiment, if the behavioral patterns or rules are applied after the interaction is complete, the number of inconsistencies may be identified. If the number of inconsistencies exceeds a threshold, the user may be presented with a different interactive puzzle or game, or the process may stop.

In one embodiment, as additional successful authentication occur, the behavioral pattern(s) may be refined and updated based on the interaction associated with that successful interaction. Thus, with each successful authentication, there may be an increased confidence that the user is authentic.

The various embodiments described can be used with other authentication methods and systems, including both biometric and non-biometric authentication methods and systems. For example, the various embodiments may be part of a multi-layer, multi-step, and/or multi-factor authentication process.

The various embodiments described can be used with other authentication methods and systems, including both biometric and non-biometric authentication methods and systems. For example, the various embodiments may be part of a multi-layer, multi-step, and/or multi-factor authentication process. In addition, the different embodiments disclosed herein are not exclusive to each other, and all or parts of each embodiment may be used in conjunction with other embodiments.

The disclosures of the following documents are hereby incorporated, by reference, in their entireties: U.S. Pat. Nos. 8,028,896 and 7,117,365; U.S. patent application Ser. Nos. 14/010,061; 13/908,618; 13/940,799; 13/972,556; 13/492,126; 13/297,475; 11/337,563, 12/534,167; 10/867,103; 12/715,520; 10/710,315; 10/710,328; 11/294,785; and U.S. Provisional Patent Application Ser. Nos. 61/861,690; 61/866,572; 61/861,676; 61/820,917; 61/844,097; and 61/823,669.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows Server operating system, the Microsoft Windows™ operating systems, the Linux operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, C#, Objective C, Swift, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention.

Accordingly, the foregoing disclosure is not intended to be construed or to limit the present invention or otherwise to exclude any other such embodiments, adaptations, variations, modifications or equivalent arrangements.

What is claimed is:

1. A method of biometric authentication, comprising:

in an information processing apparatus including at least a memory, a communication interface, at least one computer processor, a display, and an image capture device:

receiving streaming images of a user's face captured by the image capture device;

graphically presenting, on the display, the streaming images of the user's face and a computer-generated moveable object overlaid on the streaming images of the user's face, wherein the computer-generated moveable object comprises a dot, a graphic, or a symbol;

detecting a movement of a feature of the user's face in the streaming images;

graphically presenting the movement of the feature of the user's face on the display by moving the computer-generated moveable object in a direction of the movement of the feature of the user's face; and determining whether the user is live based on the movement.

2. The method of claim 1, further comprising:

extracting a biometric feature from at least one image in the streaming images;

retrieving a stored biometric feature for the user; and authenticating the user by comparing the extracted biometric feature to the stored biometric feature.

3. The method of claim 2, further comprising:

receiving identifying information for the user, wherein the identifying information is used to retrieve the stored biometric feature for the user.

4. The method of claim 1, further comprising:

extracting a biometric feature from at least one image in the streaming images;

identifying a matching biometric feature that matches the extracted biometric feature in a database comprising a plurality of stored biometric features;

retrieving an identity associated with the matching biometric feature; and authenticating the user.

5. The method of claim 1, wherein the information processing apparatus is a mobile electronic device.

6. The method of claim 1, wherein the information processing apparatus is a point of transaction device.

7. The method of claim 1, wherein the information processing apparatus is an access device for a protected area.

8. The method of claim 1, further comprising:

graphically presenting, on the display, a target; and instructing the user to graphically move the computer-generated moveable object toward the target using the movement of the feature of the user's face.

* * * * *